(12) United States Patent
Zhang et al.

(10) Patent No.: US 7,054,094 B2
(45) Date of Patent: May 30, 2006

(54) REAL-TIME AUTOMATIC LOOP-SHAPING FOR A DISC DRIVE SERVO CONTROL SYSTEM

(75) Inventors: Tao Zhang, Kingston (CA); Kevin Arthur Gomez, Singapore (SG); Qiang Bi, Singapore (SG); MingZhong Ding, Singapore (SG); Stephen Kow Chiew Kuan, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 827 days.

(21) Appl. No.: 09/896,895

(22) Filed: Jun. 29, 2001

(65) Prior Publication Data

US 2002/0093754 A1    Jul. 18, 2002

Related U.S. Application Data

(60) Provisional application No. 60/254,934, filed on Dec. 12, 2000.

(51) Int. Cl.
*G11B 5/596* (2006.01)
*G11B 21/02* (2006.01)

(52) U.S. Cl. ............................. 360/77.02; 360/75
(58) Field of Classification Search .............. 360/75, 360/78.04, 78.08, 78.14, 77.02, 77.08; 318/560
See application file for complete search history.

(56) References Cited

U.S. PATENT DOCUMENTS

| | | | |
|---|---|---|---|
| 5,099,367 A | 3/1992 | Sidman | 360/77.05 |
| 5,155,422 A * | 10/1992 | Sidman et al. | 318/560 |
| 5,220,468 A | 6/1993 | Sidman | 360/77.05 |
| 5,369,345 A | 11/1994 | Phan et al. | 318/561 |
| 5,646,797 A | 7/1997 | Kadlec et al. | 360/75 |
| 5,828,515 A | 10/1998 | Kim | 360/78.06 |
| 6,417,982 B1 * | 7/2002 | Ottesen et al. | 360/77.02 |
| 6,496,320 B1 * | 12/2002 | Liu | 360/75 |
| 6,574,065 B1 * | 6/2003 | Sri-Jayantha et al. | 360/75 |
| 6,580,579 B1 * | 6/2003 | Hsin et al. | 360/77.02 |

* cited by examiner

*Primary Examiner*—Andrew L. Sniezek
(74) *Attorney, Agent, or Firm*—Westman, Champlin & Kelly

(57) ABSTRACT

An apparatus and method for improving servo loop performance in a disc drive storage system are provided. The servo loop includes a voice coil motor actuator that moves the head in response to a received servo control signal. A sensor, located in the head, senses servo information located on the disc and produces a servo signal therefrom. The servo signal is combined with a reference signal to produce a position error signal. A servo controller receives the position error signal and responsively produces the servo control signal. The servo controller includes a drive signal generator that receives the position error signal and responsively produces a driving energy signal. A vibration damping circuit receives the driving energy signal and responsively produces the servo control signal. A real-time adaptive loop shaping circuit, included in the servo loop, detects vibrations in the position error signal and responsively adjusts at least one parameter of a transfer function of the vibration damping circuit to reduce vibrations at different frequencies in the driving energy signal.

26 Claims, 11 Drawing Sheets

REAL-TIME AUTOMATIC LOOP-SHAPING FOR A DISC DRIVE SERVO CONTROL SYSTEM

CROSS-REFERENCE TO RELATED APPLICATION

The present application claims priority to U.S. Provisional Application Ser. No. 60/254,934, filed Dec. 12, 2000 and entitled "REAL-TIME AUTOMATIC LOOP-SHAPING OF DISC DRIVE SERVO CONTROL".

FIELD OF THE INVENTION

The present invention is related to disc drives. In particular, the present invention is related to disc drive servo control systems.

BACKGROUND OF THE INVENTION

In a computer disc drive, data is stored on discs in concentric tracks. In disc drives with relatively high track densities, a servo feedback loop is used to maintain a head over the desired track during read or write operations. This is accomplished by utilizing prerecorded servo information either on a dedicated servo disc or on sectors that are interspersed along a disc. During track following, the servo information sensed by the head is demodulated to generate a position error signal (PES) which provides an indication of the distance between the head and the track center. The PES is then converted into an actuator control signal, which is used to control an actuator that positions the head.

Misalignment of the read/write heads with respect to the tracks causes increases in read/write errors and a slowdown in read or write operations. Accurate positioning of read/write heads is required even in the presence of anomalies such as aging, temperature changes, changes in orientation of the disc drive, humidity, shock and vibration.

Current servo control systems are usually designed with parameters which are set at the time of system design to be the most acceptable compromise for all operating conditions including the above mentioned anomalies. Using system parameters set at the time of design or manufacture limits the servo loop's performance under changing conditions. In addition, due to the variations inherent to the manufacturing process, different drives (even different heads in one drive) may be significantly different. Thus, disc drive servo control systems using fixed parameters do not function optimally under different operating conditions. These problems worsen as track densities increase.

The present invention addresses these problems and offers other advantages over the prior art.

SUMMARY OF THE INVENTION

The present embodiments relate to servo systems that employ a real-time adaptive loop-shaping scheme that provides for detection of, and adjustment for, disturbances in the servo system, thereby addressing the above-mentioned problems.

One embodiment relates to a disc storage system that has a servo loop for positioning a head over a disc. The servo loop includes a voice coil motor actuator that moves the head in response to a received servo control signal. A sensor, located in the head, senses servo information located on the disc and produces a servo signal therefrom. The servo signal is combined with a reference signal to produce a position error signal. A servo controller receives the position error signal and responsively produces the servo control signal. The servo controller includes a drive signal generator that receives the position error signal and responsively produces a driving energy signal. A vibration damping circuit receives the driving energy signal and responsively produces the servo control signal. A real-time adaptive loop shaping circuit, included in the servo loop, detects vibrations in the position error signal and responsively adjusts at least one parameter of a transfer function of the vibration damping circuit to reduce vibrations at different frequencies in the driving energy signal.

Another embodiment relates to a method of maintaining stability in a servo loop used for positioning a head over a disc in a disc drive. The servo loop includes a voice coil motor actuator and a servo controller that controls the voice coil motor actuator. The method for maintaining stability in the servo loop includes generating a servo signal based on the position of the head over the disc. An actuator control signal for driving the voice coil motor actuator is generated based on a position error signal. The position error signal is determined by combining the servo signal with a reference signal. Vibration energy in the position error signal is detected and at least one parameter of a transfer function of the servo controller is adjusted to attenuate the detected vibration energy at different frequencies.

These and various other features as well as advantages which characterize the present invention will be apparent upon reading of the following detailed description and review of the associated drawings.

BRIEF DESCRIPTION OF THE DRAWINGS

FIGS. 5-1 and 5-2 are bode plots for different gains of the notch filter of FIG. 4.

FIGS. 10-1 and 10-2 are bode plots for an NRRO compensator.

FIGS. 13-1 and 13-2 are bode plots for an RV compensator.

DETAILED DESCRIPTION OF ILLUSTRATIVE EMBODIMENTS

Figure 1:
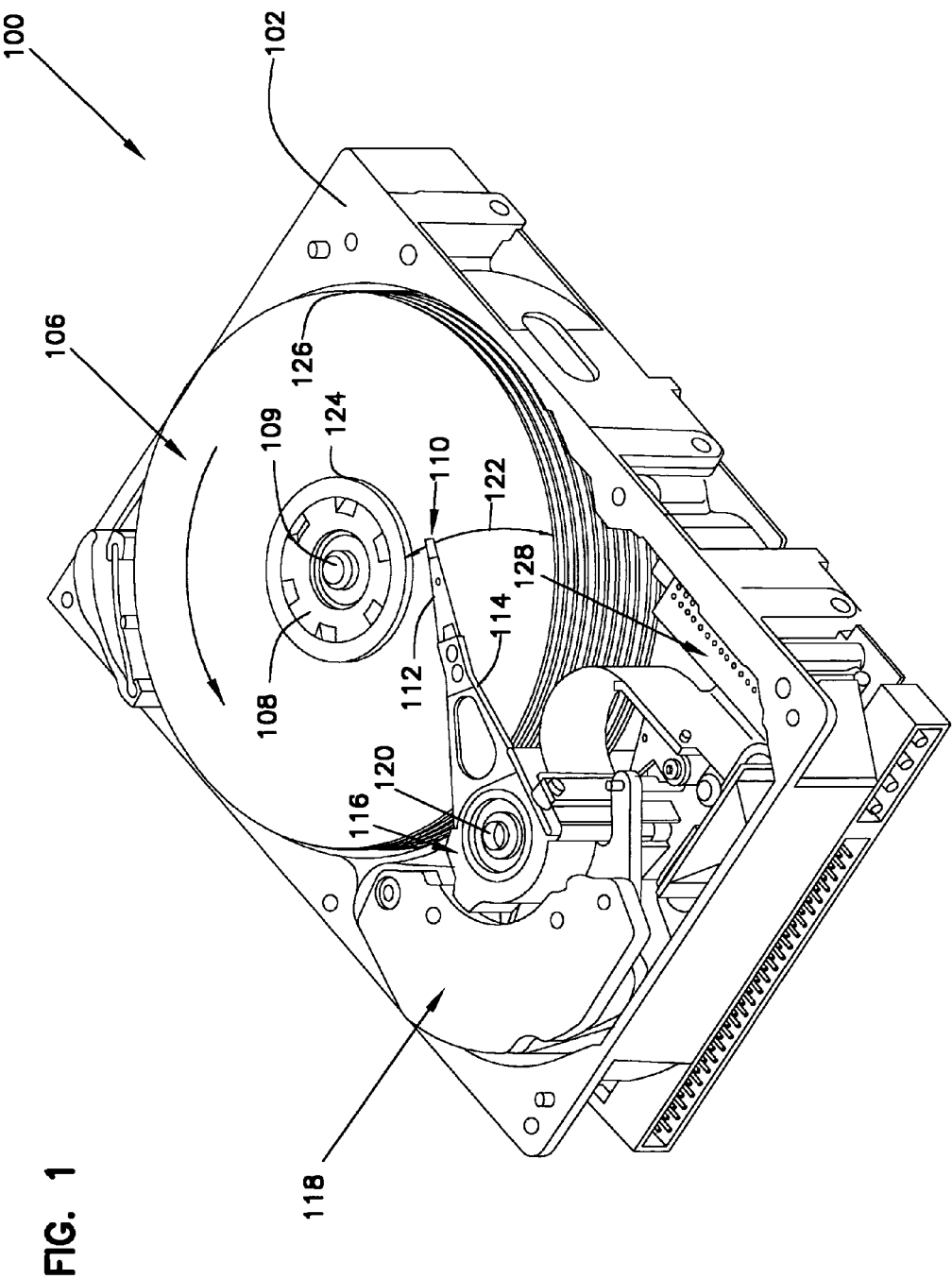
FIG. 1 is a perspective view of a disc drive in which aspects of the present invention may be practiced.

Referring now to FIG. 1, a perspective view of a disc drive 100 in which the present invention is useful is shown. The same reference numerals are used in the various figures to represent the same or similar elements. Disc drive 100 includes a housing with a base 102 and a top cover (not shown). Disc drive 100 further includes a disc pack 106 which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. VCM 118 rotates actuator 116 with its attached head 110 about a pivot shaft 120 to position head 110 over a desired data track along an arcuate path 122 between a disc inner diameter 124 and a disc outer diameter 126. VCM 118 is driven by servo electronics 128 based on signals generated by heads 110 and a host computer (not shown).

Figure 2:
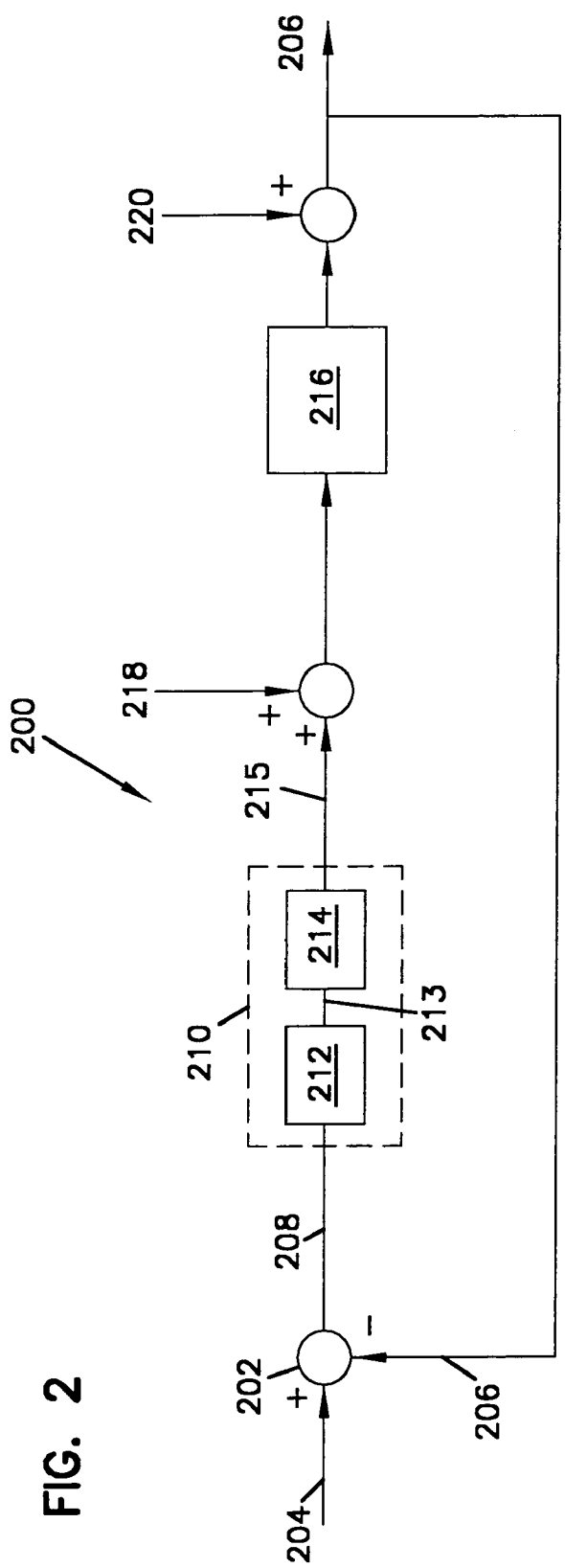
FIG. 2 is a block diagram of a servo loop of the prior art.

Referring now to FIG. 2, a block diagram of a servo loop 200 that is found in servo electronics 128 (shown in FIG. 1) of the prior art is shown. Because precise structure of the servo loop is not significant to the present invention, servo loop 200 is shown in a simplified form. Those skilled in the art will appreciate that servo loops are more complex than the simple diagram of FIG. 2.

In FIG. 2, servo loop 200 includes a summing node 202 that receives a reference signal 204 indicating the desired position for a head on the disc. Summing node 202 combines reference signal 204 with a servo signal 206, described below, to produce a PES 208 that is provided to a VCM controller 210. VCM controller 210 includes a drive signal generator or nominal controller 212 which receives the PES and generates a driving energy signal or nominal control signal 213 which may be composed of frequency components which range from direct current to multiple kilohertz or higher. Driving energy signal 213 is provided to a vibration damping circuit or module 214 which filters vibration frequency components from driving energy signal 213 to provide a servo control signal 215 to VCM 216. The servo control signal causes VCM 212 to move, thereby changing the position of the head over the disc. Disturbances in servo loop 200 are shown by torque disturbance 218 (including windage, rotational vibration, etc.), and head position disturbances 220 (including written-in-error, measurement noises, disc motion, etc.).

Using servo patterns stored on the disc, the head generates an analog signal that indicates the distance from the head to the track center. The analog signal is converted into a digital signal 206 and digital signal 206 is fed back to summing node 202. Summing node 202 then subtracts digital signal 206 from reference signal 204 to produce PES 208.

Vibration damping circuit 214 can include, for example, a notch filter, an RV compensator, an NRRO compensator, active and passive damping compensators, etc. Various methods of implementing these compensators are known in the art.

As mentioned above, prior art servo loops (such as 200) are usually designed with parameters which are set at the time of system design to be the most acceptable compromise for all operating conditions including the above mentioned disturbances (218, 220). Although many of the disturbances such as mechanical resonance are similar from head to head and disc to disc, subtle difference can be seen in frequency, gain, phase, the width of the frequency band, or a combination of all four for any particular resonance. In addition, the disturbances in a servo loop (such as 200) also vary with time. Thus, using vibration damping circuit parameters that are set at the time of manufacture results in a compromise in performance of the servo loop.

Embodiments of the present invention relate to servo systems that employ a real-time adaptive loop-shaping scheme that provides for detection of, and adjustment for, disturbances in the servo system by adjusting parameters of the vibration damping circuit.

Figure 3:
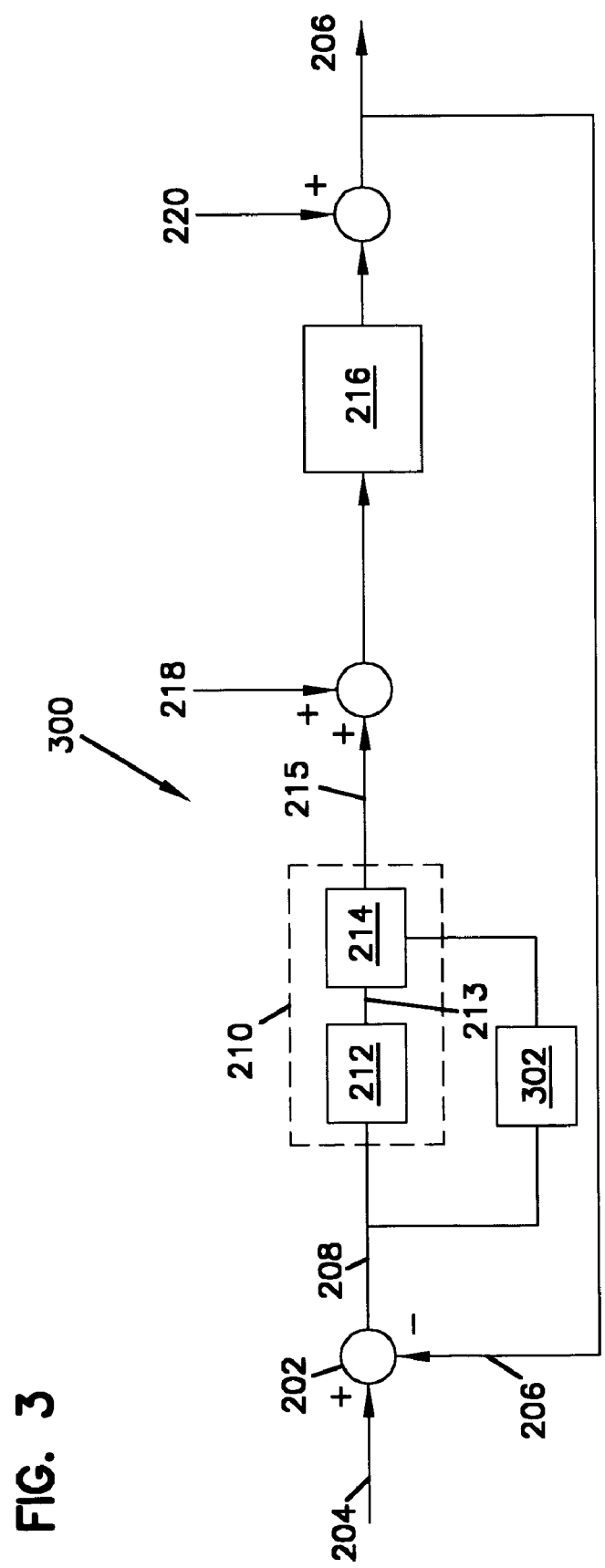
FIG. 3 is a block diagram of a servo loop with a real-time adaptive loop shaping module or circuit in accordance with an embodiment of the present invention.

Referring now to FIG. 3, a simplified block diagram of a servo-loop 300 in accordance with an embodiment of the present invention is shown. The same reference numerals are used to represent the same or similar elements of loops 200 (FIG. 2) and 300 (FIG. 3). In accordance with an illustrative embodiment of the present invention, servo loop 300 includes a real-time adaptive loop shaping module or circuit 302 which detects vibration energy components in PES 208. Based on amplitudes of the detected vibrations, module 302 responsively adjusts the parameters of vibration damping circuit 214 to attenuate the driving current 213 at different frequencies to minimize vibration energy in servo control signal 215. In the absence of any vibration energy in PES 208, parameters of vibration damping circuit 214 are adjusted by module 302 such that filter 214 is deactivated, thereby optimizing the performance of servo loop 300. Details of the operation of real-time adaptive loop shaping circuit 302 in connection with different vibration damping compensators are provided below.

Each of the mechanical components of disc drive 100 (of FIG. 1) have various resonant modes that if excited by an external energy source will cause the part to physically move at the natural frequencies of oscillation for the component in question. This movement can occur in a bending mode, a twisting mode or a combination of the two. If the component is highly undamped (i.e. the resonance is a high amplitude, narrow frequency band) it will tend to oscillate with a minimal external driving energy. This oscillation results in physical motion of the data head 110, causing off track errors and potential fly height problems. These oscillations are often referred to as "resonances."

Figure 4:
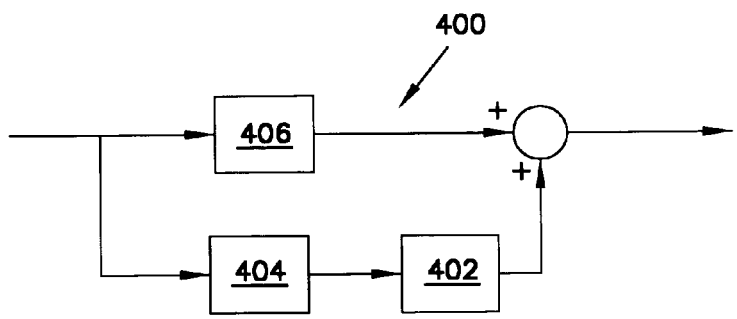
FIG. 4 illustrates a notch filter module for use with an embodiment of the present invention.

One type of filter that is widely used to remove driving energy at the mechanical resonant modes is a notch filter (shown in FIG. 4). A notch filter is a band-rejection filter that produces a sharp notch in the frequency response curve of the disc drive servo loop. When a notch filter is activated by the servo control loop, the open loop response ends up a summation of the original response plus the notch filter response. If the notch filter is centered about the frequency where the peak amplitude of the mechanical resonance occurs, then the driving force energy at this frequency can be reduced so that there will be little or no energy made available to excite the mechanical structure.

Prior art servo loops (such as 200 of FIG. 1) generally include a notch filter in vibration damping circuit 214. However, the pre-defined notch filter parameters set at the time of manufacture usually remain fixed during the operation of prior art servo loop 200. A disadvantage of adding a notch filter is that the servo-loop phase drop increases, and therefore the phase margin of the overall servo system reduces. Further, the wider the applied notch filter, the more the loop phase loss. Thus, it is preferable not to use the notch filter until it is needed (i.e., when disturbances are amplified due to certain resonances).

An embodiment of a notch filter module or circuit 400 included in a vibration damping circuit (such as 214) is illustrated in FIG. 4. Block 402 represents a base notch filter, C, with sufficient depth (for example, 20–30 dB attenuation) to reduce vibrations caused by high frequency resonance modes. Block 404 represents the gain, K, of the notch filter module 400 and block 406 represents a coefficient (1−K). The transfer function, $F_k$ (EQ. 1 below), of the notch filter module 400 takes on different values based on the value of gain K.

$$F_k = 1 - K + K \cdot C \quad \text{EQ. 1}$$

Figures 1, 5:
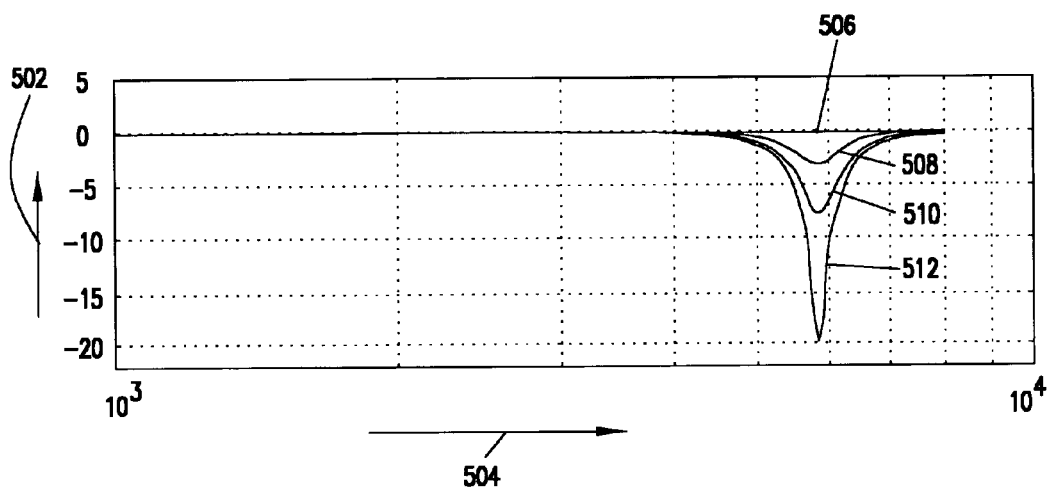
Figures 2, 5:
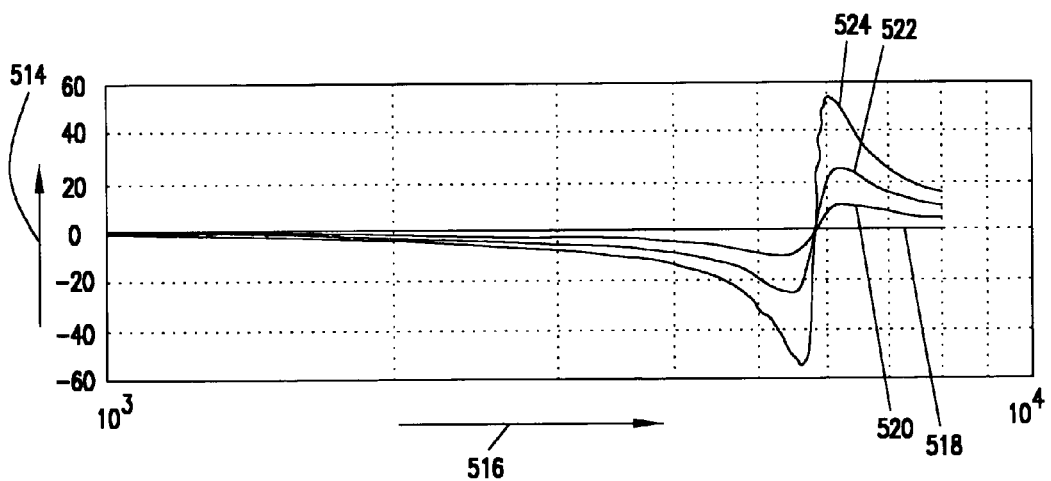

Referring now to FIGS. 5-1 and 5-2, bode plots for different gains (different values of K) of the notch filter module 400 of FIG. 4 are shown. FIG. 5-1 shows plots of the variation of the magnitude of $F_k$ in dB along vertical axis 502 as a function of frequency in Hz along horizontal axis 504. Plots 506, 508, 510 and 512 are magnitude plots for gain (K) equal to 0, 0.3, 0.6 and 0.9, respectively. FIG. 5-2 shows plots of the variation of the phase of $F_k$ in degrees along vertical axis 514 as a function of frequency in Hz along horizontal axis 516. Plots 518, 520, 522 and 524 are phase plots for gain (K) equal to 0, 0.3, 0.6 and 0.9, respectively. FIGS. 5-1 and 5-2 indicate that as the gain, K, changes from 0 to 1, the transfer function, $F_k$ (EQ. 1), changes, resulting in different depths of notch filter 400. When K=0 no notch filter is added. As K increases, the depth of the notch filter module 400 increases. When K=1, the base notch filter, C (402), is obtained. Typically, the design of C (402) should guarantee that the servo loop satisfies a minimum phase margin requirement.

The sensitivity function or error function of the servo loop is the ability of a servo loop (such as 300) to attenuate disturbance. EQ. 2 below defines the error function E.

$$E = \frac{1}{1+T} \quad \text{EQ. 2}$$

T is the open loop transfer function of the servo loop (such as 300). Usually, not all resonance modes result in bubbles or peaks in the error function. If the open loop has a stable phase at a certain resonance frequency, there is no peak in the error function and a notch filter need not be added to handle such a resonance mode. Thus, to optimize the performance of the servo loop, the notch filter needs to be activated or de-activated based on vibration energy detected in the servo loop.

Figure 6:
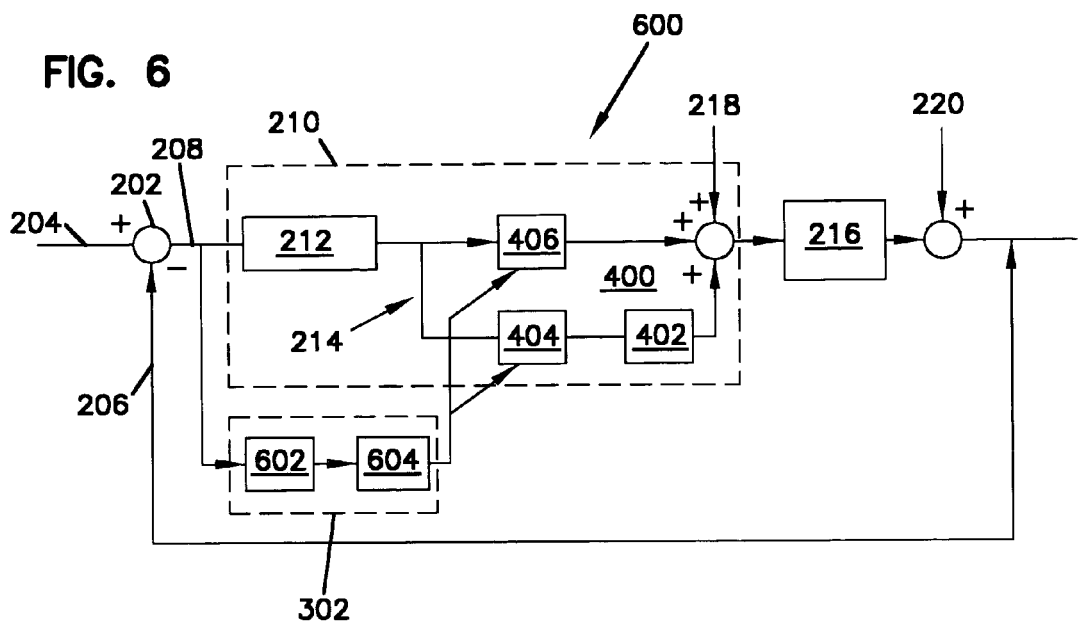
FIG. 6 illustrates a servo loop with a real-time adaptive loop shaping circuit that adjusts the depth of a notch filter in accordance with an embodiment of the present invention.
Figure 7:
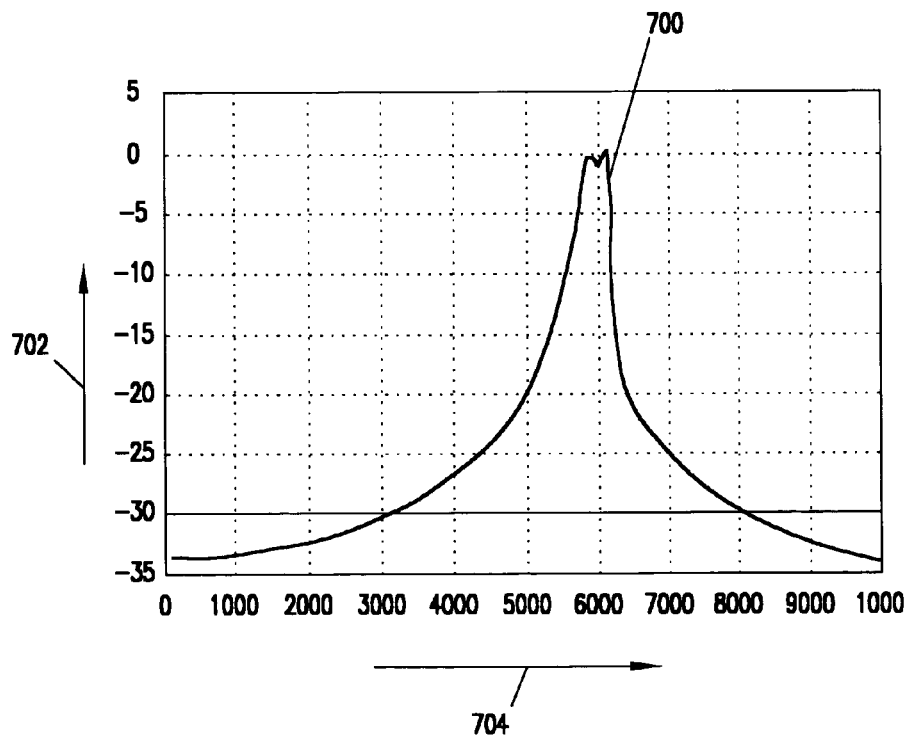
FIG. 7 is a bode plot of a band-pass filter employed in the real-time adaptive loop shaping circuit of FIG. 6.

Referring now to FIG. 6, a servo loop with a real-time adaptive loop shaping circuit that adjusts the depth of a notch filter in accordance with an embodiment of the present invention is shown. Loop-shaping module 302 includes block 602 that represents a band-pass filter, F, and block 604 that represents a parameter, g, which is a learning rate of an adaptive law described further below. To identify whether notch filter 400 is needed for a resonance mode (usually located within a certain narrow range), band-pass filter 602 is applied to detect the vibration energy of PES 208 at this frequency mode. If the energy exceeds a certain limit, notch filter 400 will be added. A bode plot of a fourth-order band-pass filter (such as 602) is shown in FIG. 7. Plot 700 represents the variation of gain in dB of the band pass filter (such as 602) along vertical axis 702 as a function of frequency in Hz along horizontal axis 704. The depth of notch filter 400 is adjusted according to the amplitude of the filtered signal obtained from band-pass filter 602. Thus, a real-time identification of resonance peaks and a corresponding real-time tuning of the notch filter are provided. Details of a real-time tuning algorithm employed by loop shaping circuit 302 are provided below.

Figure 8:
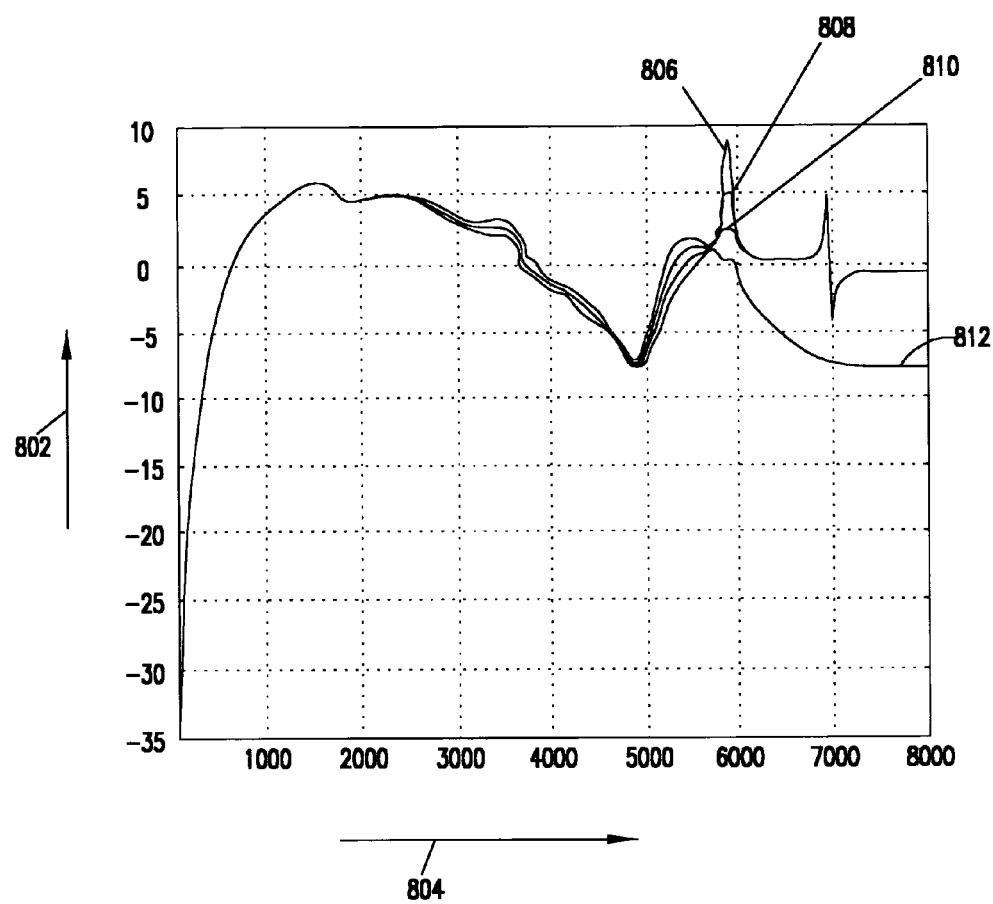
FIG. 8 is the frequency response of the error function of the servo loop with a notch filter under different values of gain.

As mentioned above, the sensitivity function or error function of the servo loop is the ability of a servo loop to attenuate disturbance. FIG. 8 shows plots of the variation of magnitude in dB of the error function of the closed-loop servo system 600 along vertical axis 802 as a function of frequency along horizontal axis 804. Plots 806, 808, 810 and 812 are magnitude plots for gain (k) equal to 0, 0.3, 0.6, and 1.0, respectively. Without notch filter (K=0 plot 806), the resonance mode causes a high spike round 5.8 KHz. As gain K increases, the amplitude of the error function at 5.8 KHz decreases from 9.2 dB to 0.6 dB. The tuning of notch filter gain K is important for achieving good tracking performance in disc drives (such as 100). The present embodiments employ a real-time tuning algorithm, described below, that automatically adjusts the gain K.

The following adaptive law is used for real-time tuning of notch filter module 400.

$$K(t) = \alpha \cdot K(t-1) + \frac{\beta |e_f(t)|}{1+|e_f(t)|}, \quad \text{EQ. 3}$$

with $$e_f(t) = \begin{cases} |g \cdot F(z) \cdot y(t)| - e_0, & \text{if } |g \cdot F(z) \cdot y(t)| > e_0 \\ 0, & \text{otherwise} \end{cases} \quad \text{EQ. 4}$$

where $\alpha + \alpha \leq 1$, $\alpha, \beta, g, e_o > 0$ and $K(0)=0$. The parameters $\beta$ and g determine the learning rates which can adjust the speed of the adaptation. The positive constant $e_o$ is a threshold to determine when to increase the notch filter gain $K(t)$ and $e_f(t)$ is the filtered signal (output of band-pass filter 602). The tuning law (EQS. 3 and 4) is analyzed under two different cases below. Case 1: $|g \cdot F(z) \cdot y(t)| > e_o$ In EQ. 5 below, $\Delta V(t)$, which is the difference between $K^2(t+1)$ and $K^2(t)$ of a positive definite function V(t) $K^2(t)$ is calculated below.

$$\Delta V(t) = K^2(t+1) - K^2(t) \qquad \text{EQ. 5}$$
$$= [K(t+1) - K(t)][K(t+1) + K(t)]$$
$$= \left[ -(1-\alpha)K(t) + \frac{\beta|e_f(t+1)|}{1+|e_f(t+1)|} \right]$$
$$\left[ (1+\alpha)K(t) + \frac{\beta|e_f(t+1)|}{1+|e_f(t+1)|} \right]$$
$$= -(1-\alpha^2)K^2(t) + 2\alpha\beta K(t)\frac{|e_f(t+1)|}{1+|e_f(t+1)|} +$$
$$\beta^2 \frac{e_f^2(t+1)}{[1+|e_f(t+1)|]^2}$$

Since $$\frac{|e_f(t+1)|}{1+|e_f(t+1)|} < 1, \qquad \text{EQ. 6}$$

it follows that $$\Delta V(t) \leq -(1-\alpha^2)K^2(t) + 2\cdot\alpha\beta\cdot K(t) + \beta^2 \qquad \text{EQ. 7}$$
$$= -(1-\alpha^2)\left\{ \left[ K(t) - \frac{\alpha\beta}{1-\alpha^2} \right]^2 - \frac{\beta^2}{(1-\alpha^2)^2} \right\}$$

In EQ. 7 $\Delta V(t) < 0$ if $$K(t) > \frac{\beta}{1-\alpha} \qquad \text{EQ. 8}$$

From EQ. 8 it follows that $$K(t+1) \leq K(t) \leq \frac{\beta}{1-\alpha}.$$

Since $\alpha+\beta \leq 1$, it follows that $K(t) \leq 1$ for all values of t (time).

Case 2: $|g \cdot F(z) \cdot y(t)| \leq e_o$

Here, $$K(t) = \alpha \cdot K(t-1), \text{ with } 0 < \alpha < 1 \qquad \text{EQ. 9}$$

When the filtered signal $e_f(t)$ is less than a specific threshold, the gain K(t) becomes smaller and smaller. Thus, if $|e_f(t)| \leq e_o$, K(t) goes to zero, and no notch filter is added in the servo loop.

Embodiments of the present invention also provide for automatic loop shaping for NRRO cancellation. NRRO disturbances include disc flutter, bearing mode/defects and motor/disc vibration. As the track pitch of disc drives decrease, NRRO problems increase. The present embodiments provide a technique for adjusting an NRRO compensator to change dynamically according to detected NRRO disturbances.

Figure 9:
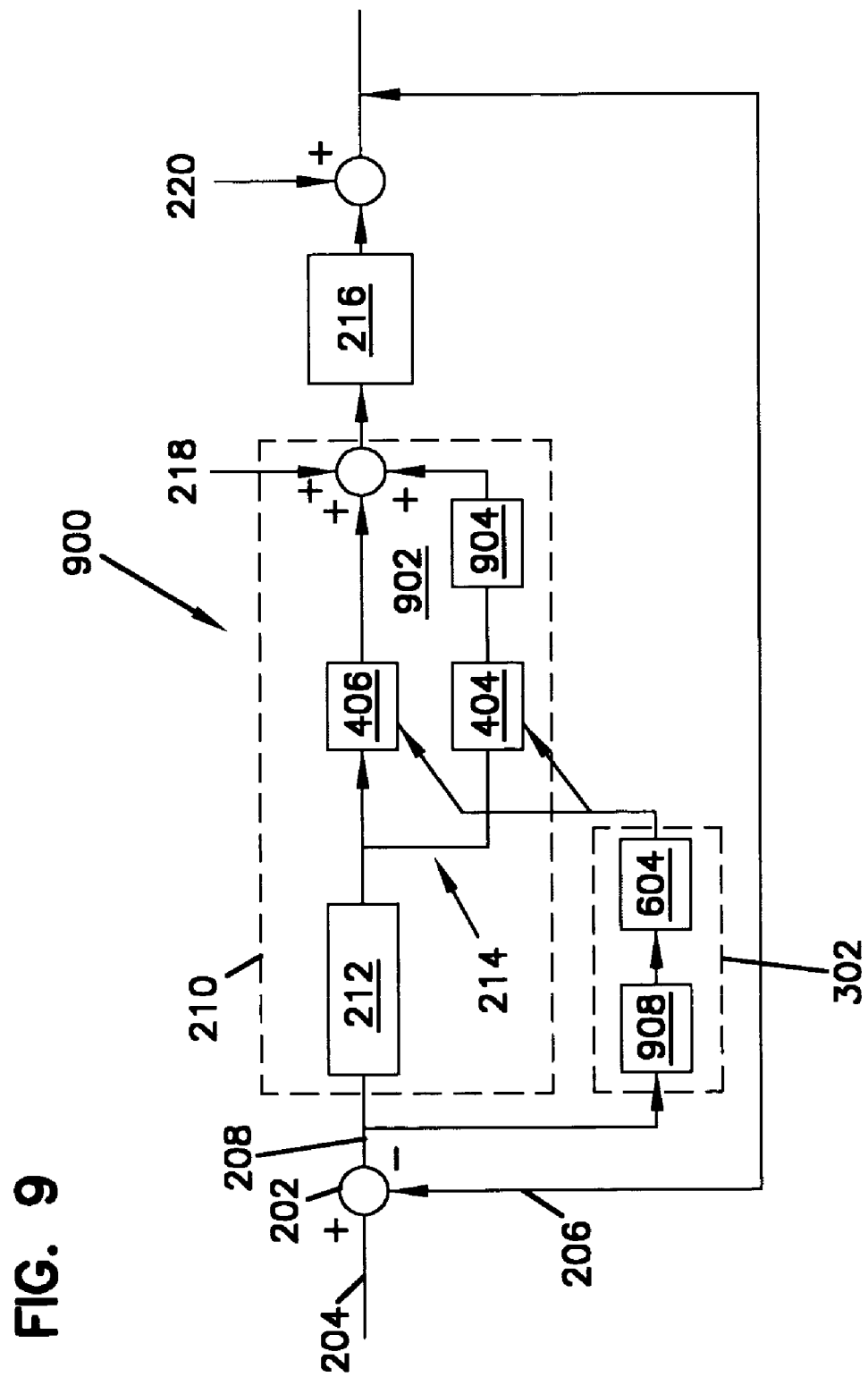
FIG. 9 illustrates a servo loop with a real-time adaptive loop shaping circuit used in connection with a non-repeatable runout (NRRO) compensator in accordance with an embodiment of the present invention.

Referring now to FIG. 9, a servo loop with a real-time adaptive loop shaping circuit used in connection with an NRRO compensator in accordance with an embodiment of the present invention is shown. The vibration damping circuit 214 in servo loop 900 includes a base NRRO compensator 904 instead of base notch filter, C (402), of servo loop 600. Also, band-pass filter 908, which is designed to detect NRRO vibration energy differs in design from filter, F (602), of servo loop 600. The remaining elements of servo loop 900 are similar to the elements of servo loop 600 of FIG. 6. The real-time adjustment of parameters of the NRRO compensator are described in an example provided below.

Figures 1, 10:
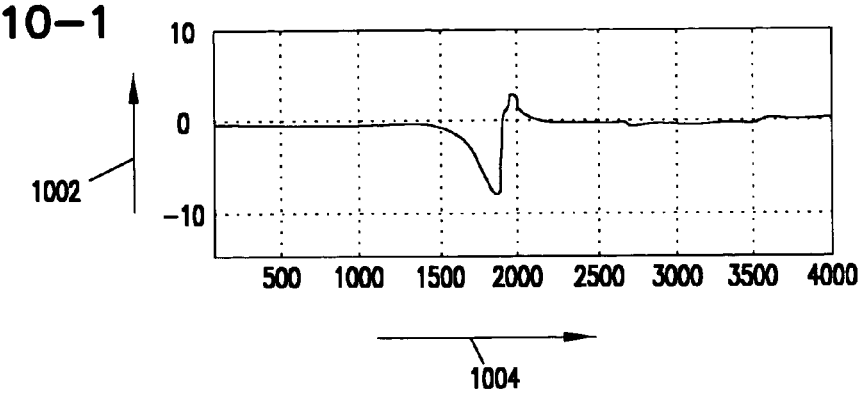
Figures 2, 10:
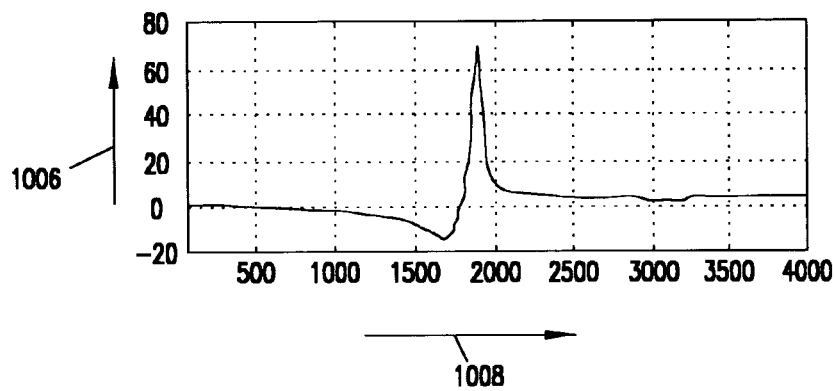
Figure 11:
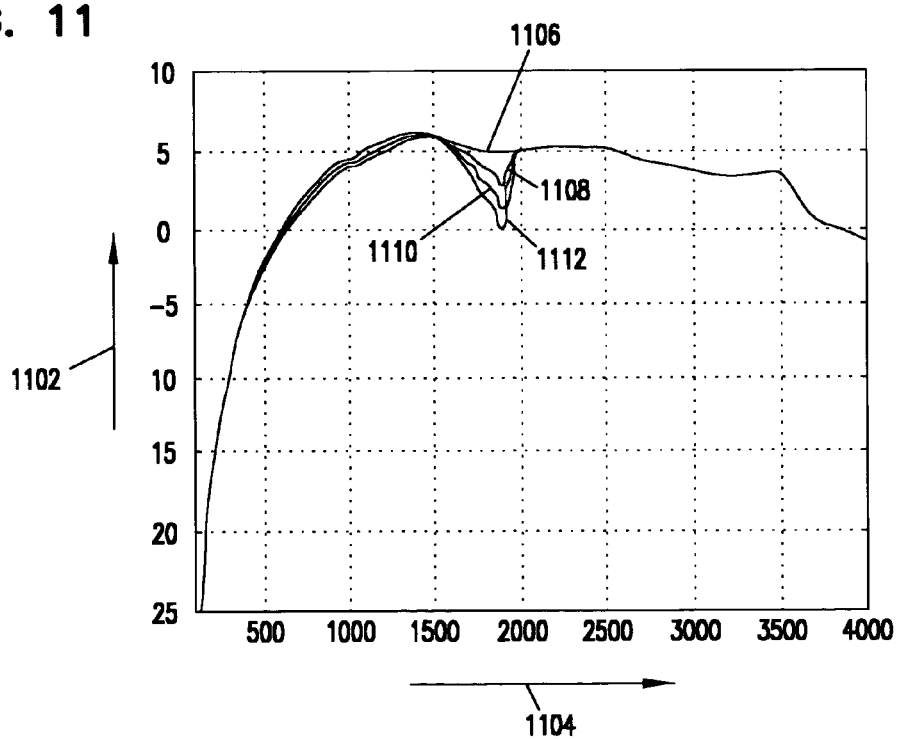
FIG. 11 is the frequency response of the error function of the servo loop with an NRRO compensator under different values of gain.

FIGS. 10-1, 10-2 and 11 are plots relating to examples for providing NRRO compensation for 1.8 kHz NRRO disturbance. FIG. 10-1 shows a plot of the variation of the magnitude of a 1.8 KHz NRRO compensator (such as 904) in dB along vertical axis 1002 as a function of frequency in Hz along horizontal axis 1004. FIG. 10-2 shows a plot of the variation of the phase of a 1.8 kHz NRRO compensator (such as 904) in degrees along vertical axis 1006 as a function of frequency in Hz along horizontal axis 1008. The amplitude of 1.8 kHz NRRO is different from drive to drive and head to head and can even change from time to time for the same head. A 1.8 kHz band-pass filter (such as 908) detects the NRRO energy in PES 208. FIG. 11 shows plots of the variation of magnitude in dB of the error function (sensitivity function) of the closed-loop servo system 900 along vertical axis 1102 as a function of frequency along horizontal axis 1104. Plots 1106, 1108, 1110 and 1112 are magnitude plots for gain (K) equal to 0, 0.3, 0.6, and 1.0, respectively. As gain K increases, the amplitude of the error function at 1.8 kHz decreases. By using the adaptive tuning law (EQS. 3 and 4) for adjusting the gain K, the error function, described above, is automatically tuned according to the NRRO amplitude around the frequency of 1.8 kHz. Thus, the NRRO compensator only takes action when necessary. If very small NRRO components are concentrated around 1.8 kHz, gain K will be adjusted to zero, thereby temporarily deactivating the NRRO compensator.

Embodiments of the present invention also provide for cancellation of RV disturbances. Typically, in desktop drives, RV disturbances are mainly located within the 10–300 Hz frequency range. To improve RV performance, a commonly used scheme is to increase the low frequency servo loop gain such that the error function has high attenuation over 10–300 Hz frequency. However, increasing low frequency gain may reduce the phase margin of the servo loop, which creates a waterbed effect (reducing the effects of RV disturbance at one frequency results in amplifying RV disturbances at other frequencies). In general, for a given servo loop, the more the attenuation for RV disturbances at low frequency, the higher the amplification of PES at high frequency, due to the waterbed effect.

In a working environment of disc drives, large RV disturbances may not always be present. In drives where RV disturbance is absent or very small, adding an RV compensator may worsen the overall tracking performance because of the amplification of high frequency PES. Hence, if RV disturbances are not large, there is no need to design a very high loop gain at low frequency. The present embodiments provide a tuning mechanism which has the ability to detect the energy of RV disturbances and automatically adjust the low frequency loop gain.

Figure 12:
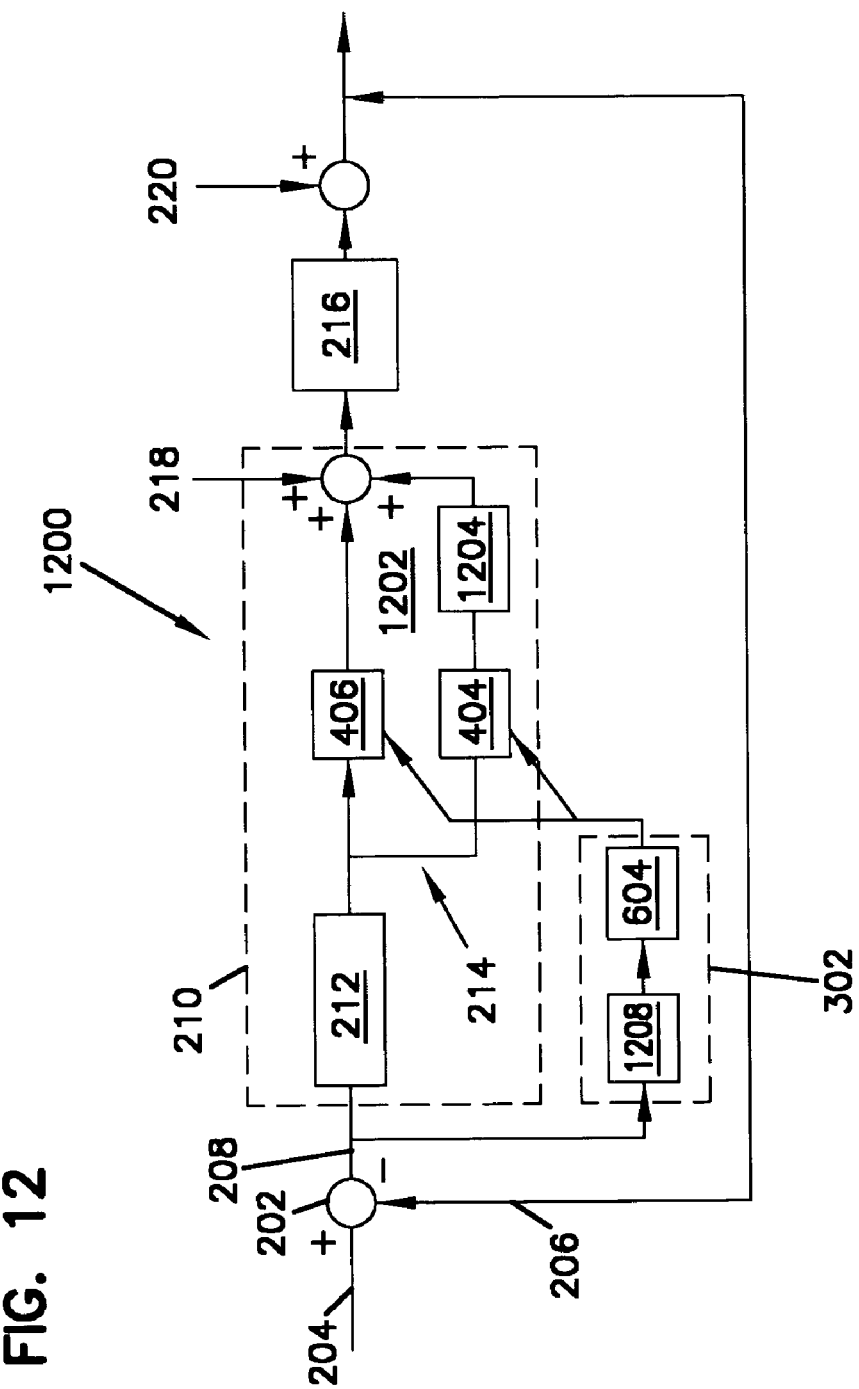
FIG. 12 illustrates a servo loop with a real-time adaptive loop shaping circuit used in connection with a rotational vibration (RV) compensator in accordance with an embodiment of the present invention.

Referring now to FIG. 12, a servo loop with a real-time adaptive loop shaping circuit used in connection with an RV compensator in accordance with an embodiment of the present invention is shown. The vibration damping circuit 214 in servo loop 1200 includes a base RV compensator 1204 instead of base notch filter, C (402), of servo loop 600. Also, low-pass filter 1208, which is designed to detect RV disturbance energy differs in design from filter, F (602), of servo loop 600. The remaining elements of servo loop 1200 are similar to the elements of servo loop 600 of FIG. 6. The real-time adjustment of parameters of the RV compensator are described in an example provided below.

Figures 1, 13:
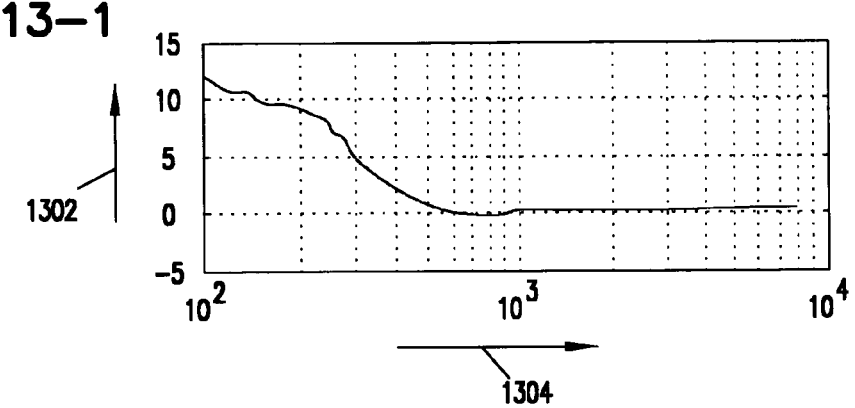
Figures 2, 13:
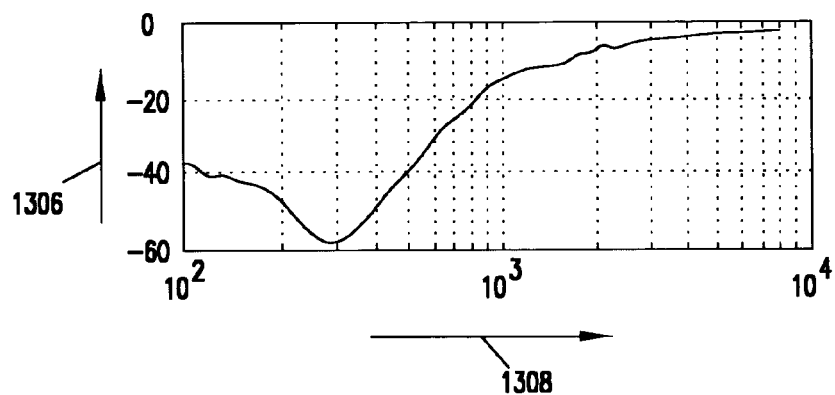
Figure 14:
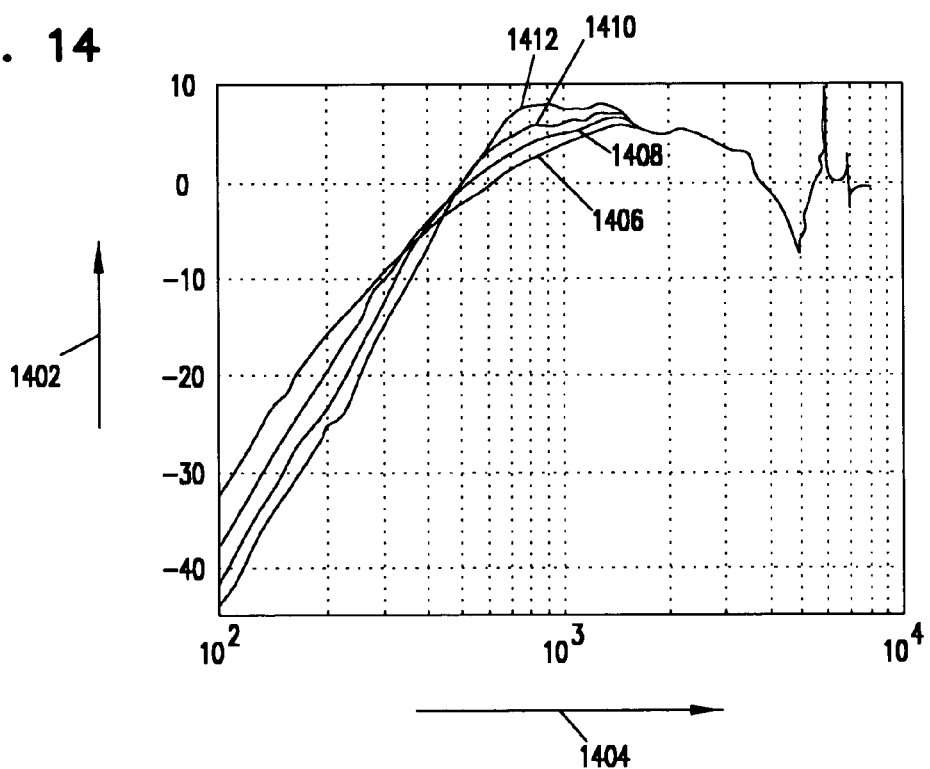
FIG. 14 is the frequency response of the error function of the servo loop with a RV compensator under different values of gain.

FIGS. 13-1,13-2 and 14 are plots relating to examples for RV compensation. FIG. 13-1 shows a plot of the variation of the magnitude of an RV compensator (such as 1204) in dB along vertical axis 1302 as a function of frequency in Hz along horizontal axis 1304. Below 300 Hz the RV compensator can provide about 10 dB increase in servo loop gain. FIG. 13-2 shows a plot of the variation of the phase of an RV compensator (such as 1204) in degrees along vertical axis 1306 as a function of frequency in Hz along horizontal axis 1308. A low-pass filter (such as 1208) detects the amplitude of RV disturbances in PES 208. FIG. 14 shows plots of the variation of magnitude in dB of the error function (sensitivity function) of the closed-loop servo system 1200 along vertical axis 1402 as a function of frequency along horizontal axis 1404. Plots 1406, 1408, 1410 and 1412 are magnitude plots for gain (K) equal to 0, 0.3, 0.6, and 1.0, respectively. By using the adaptive tuning law (EQS. 3 and 4) for adjusting the gain K, the error function, described above, is automatically tuned according to the amplitude of RV disturbance. Thus, the RV compensator 1204 only takes action when necessary.

Figure 15:
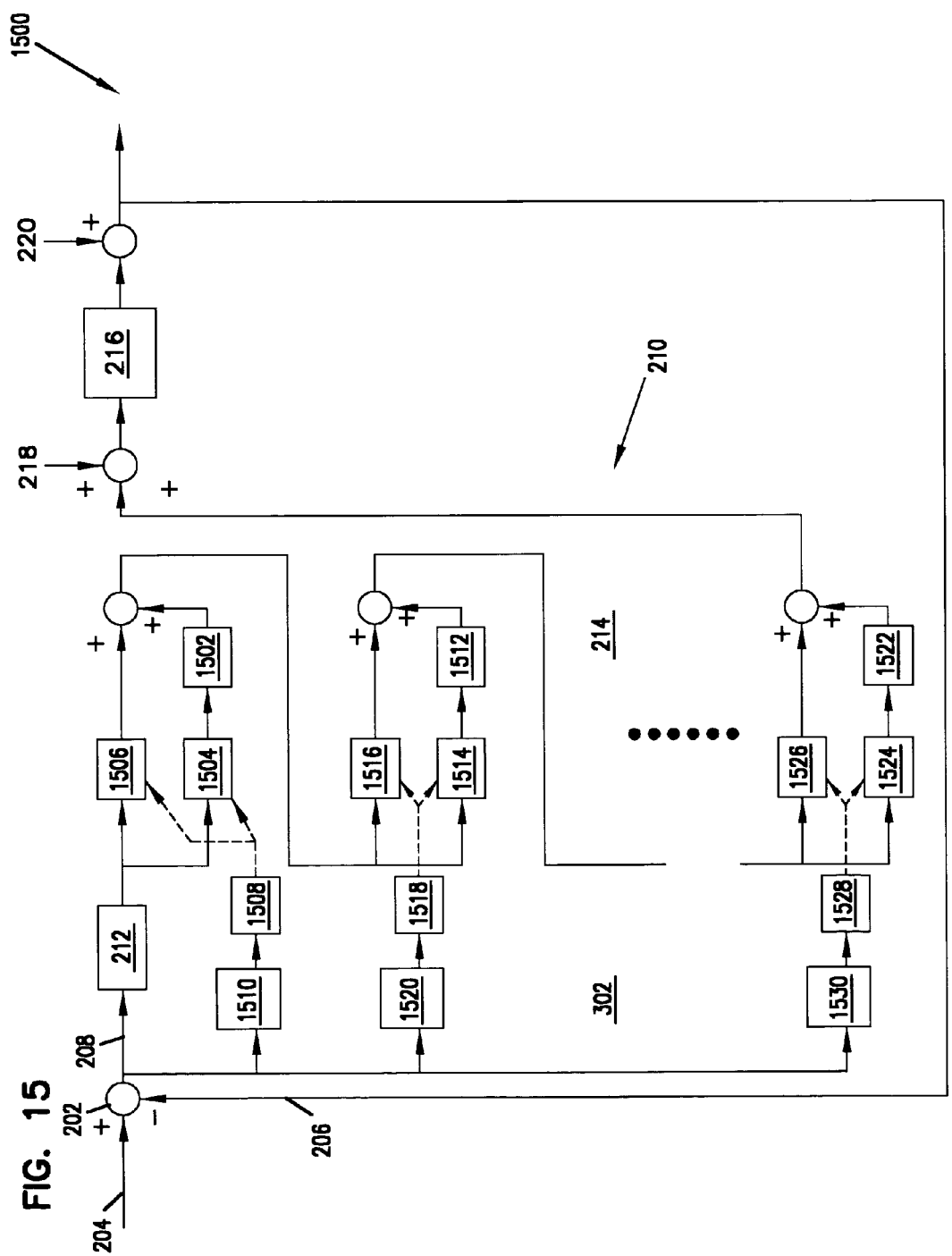
FIG. 15 is a block diagram of a combined real-time automatic loop-shaping module in accordance with an embodiment of the present invention.

The above embodiments have presented loop-shaping schemes for adjusting the depth of a notch filter (such as 402), automatic NRRO cancellation and RV rejection. These are only some examples of automatic loop shaping designs. The control structure presented in the above embodiments can be modified for adaptive tuning of many other kinds of compensators such as active damping and passive damping compensators without departing from the scope and spirit of the present invention. Furthermore, the different embodiments of real-time adaptive loop-shaping module 302, can be combined for use in one servo control loop (such as 1500) shown in FIG. 15. Vibration damping circuit 214 includes several compensators $C_1$ to $C_n$ (1502, 1512 and 1522) which can be NRRO compensators, RV compensators, etc. Loop shaping circuit 302 includes vibration detection filters $F_1$ to $F_n$ (1510, 1520 and 1530) which are used to identify the specific vibration signals for the adaptive tuning of $K_1$ to $K_n$ (1504, 1514 and 1524). Blocks 1506, 1516 and 1526 represent $1-K_1$ to $1-K_n$ and blocks 1508, 1518 and 1528 represent gain parameters $g_1$ to $g_n$.

In summary, a servo loop embodiment for a disc drive (such as 100) for positioning a head (such as 110) over a disc (such as 106) while maintaining servo loop stability is provided. The servo loop (such as 300) includes a voice coil motor actuator (such as 216) that moves the head (such as 110) in response to a received servo control signal (such as 215). A sensor, located in the head (such as 110), senses servo information located on the disc (such as 106) and produces a servo signal (such as 206) therefrom. The servo signal is combined with a reference signal (such as 204) to produce a position error signal (such as 208). A servo controller (such as 210) receives the position error signal (such as 208) and responsively produces the servo control signal (such as 215). The servo controller includes a drive signal generator (such as 212) that receives the position error signal (such as 208) and responsively produces a driving energy signal (such as 213). A vibration damping circuit (such as 214) receives the driving energy signal (such as 213) and responsively produces the servo control signal (such as 215). A real-time adaptive loop shaping circuit (such as 302), included in the servo loop (such as 300), detects vibrations in the position error signal (such as 208) and responsively adjusts at least one parameter of a transfer function of the vibration damping circuit (such as 214) to reduce vibrations at different frequencies in the driving energy signal (such as 213).

A method for maintaining stability in a servo loop used for positioning a head (such as 110) over a disc (such as 106) in a disc drive (such as 100) is provided. The servo loop (such as 300) includes a voice coil motor actuator (such as 212) and a servo controller (such as 210) that controls the voice coil motor actuator (such as 212). The method for maintaining stability in the servo loop (such as 300) includes generating a servo signal (such as 206) based on the position of the head (such as 110) over the disc (such as 106). An actuator control signal for driving the voice coil motor actuator (such as 212) is generated based on a position error signal (such as 208). The position error signal (such as 208) is determined by combining the servo signal (such as 206) with a reference signal (such as 204). Vibration energy in the position error signal (such as 208) is detected and at least one parameter of a transfer function of the servo controller (such as 210) is adjusted to attenuate the detected vibration energy at different frequencies.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the servo system while maintaining substantially the same functionality without departing from the scope and spirit of the present invention. In addition, although the preferred embodiment described herein is directed to real-time automatic loop shaping for a disc drive servo control system, it will be appreciated by those skilled in the art that the teachings of the present invention can be applied to other control systems, without departing from the scope and spirit of the present invention. Further, the real-time adaptive loop shaping scheme may be implemented in hardware or software. The disc drive can be based upon magnetic, optical, or other storage technologies and may or may not employ a flying slider.

What is claimed is:

1. An apparatus comprising:
   a vibration damping circuit coupled to receive a driving energy signal; and
   a real-time adaptive loop shaping circuit configured to detect vibration energy in position error signal in real-time, and to responsively adjust, in real-time, at least one parameter of a transfer function of the vibration damping circuit to reduce vibrations at different frequencies in the driving energy signal received by the vibration damping circuit.

2. The apparatus of claim 1 wherein the vibration damping circuit includes a notch filter to damp vibrations at high frequency resonance modes, and wherein the real-time adaptive loop shaping circuit is configured to detect vibrations at high frequency resonance modes in the position error signal and to responsively adjust a depth of the notch filter.

3. The apparatus of claim 2 wherein the real-time adaptive loop shaping circuit adjusts the depth of the notch filter by modifying a gain of the notch filter.

4. The apparatus of claim 2 wherein the real-time adaptive loop shaping circuit includesa band-pass filter to detect vibrations at high frequency resonance modes in the position error signal.

5. The apparatus of claim 1 wherein the vibration damping circuit includes a non-repeatable runout compensator to cancel non-repeatable runout disturbances, and wherein the real-time adaptive loop shaping circuit is configured to detect non-repeteable runout disturbances in the position error signal and to responsively adjust at least one parameter of a transfer function of the non-repeatable runout compensator.

6. The apparatus of claim 5 wherein the real-time adaptive loop shaping circuit includes a band-pass filter to detect non-repeatable runout disturbances in the position error signal.

7. The apparatus of claim 1 wherein the vibration damping circuit includes a rotational vibration compensator to cancel rotational vibration disturbances, and wherein the real-time adaptive loop shaping circuit is configured to detect rotational vibration disturbances in the position error signal and to responsively adjust at least one parameter of a transfer function of the rotational vibration compensator.

8. The apparatus of claim 7 wherein the real-time adaptive loop shaping circuit includes a low-pass filter to detect rotational vibration disturbances in the position error signal.

9. The apparatus of claim 1 wherein the vibration damping circuit includes a plurality of disturbance adjustment compensators to cancel vibration disturbances at different frequency ranges, and wherein the real-time adaptive loop shaping circuit is configured to detect vibration disturbances at the different frequency ranges in the position error signal and to responsively adjust at least one parameter of a transfer function of at least one of the plurality of disturbance compensators.

10. The apparatus of claim 1 wherein the real-time adaptive loop shaping circuit includes a learning component that adjusts a speed of adaptation of the servo loop.

11. A method of maintaining stability in a servo loop having a servo controller, the method comprising:
  (a) detecting vibration energy in a position error signal in real-time; and
  (b) adjusting, in real-time, at least one parameter of a transfer function of the servo controller to attenuate the vibration energy detected in step (a) at different frequencies.

12. The method of claim 11 wherein the detecting vibration energy step (a) includes detecting vibrations at high frequency resonance modes, and wherein the adjusting step (b) includes adjusting a depth of a notch filter of the servo controller to reduce vibrations at high frequency resonance modes.

13. The method of claim 11 wherein the detecting vibration energy step (a) includes detecting non-repeteatable runout disturbances, and wherein the adjusting step (b) includes adjusting at least one parameter of a transfer function of a non-repeatable runout compensator of the servo controller to reduce non-repeatable runout disturbances.

14. The method of claim 11 wherein the detecting vibration energy step (a) includes detecting rotational vibration disturbances, and wherein the adjusting step (b) includes adjusting at least one parameter of a transfer function of a rotational vibration compensator of the servo controller to reduce rotational vibration disturbances.

15. The method of claim 11 wherein the detecting vibration energy step (a) and the adjusting step (b) is carried out by a real-time adaptive loop shaping circuit.

16. A servo loop comprising:
  a servo controller; and
  a real-time adaptive loop shaping means for attenuating disturbances in the servo loop.

17. The apparatus of claim 16 wherein
  the real-time adaptive loop shaping means comprises a real-time adaptive loop shaping circuit adapted to:
    detect vibration energy in a position error signal in real-time, and to responsively adjust, in real-time, at least one parameter of a transfer function of a vibration damping circuit of the servo controller to reduce vibrations at different frequencies in the servo loop.

18. The apparatus of claim 17 wherein the vibration damping circuit includes a notch filter to damp vibrations at high frequency resonance modes, and wherein the real-time adaptive loop shaping circuit is configured to detect vibrations at high frequency resonance modes in the position error signal and to responsively adjust a depth of the notch filter.

19. The apparatus of claim 18 wherein the real-time adaptive loop shaping circuit adjusts the depth of the notch filter by modifying a gain of the notch filter.

20. The apparatus of claim 18 wherein the real-time adaptive loop shaping circuit includes a band-pass filter to detect vibrations at high frequency resonance modes in the position error signal.

21. The apparatus of claim 17 wherein the vibration damping circuit includes a non-repeatable runout compensator to cancel non-repeatable runout disturbances, and wherein the real-time adaptive loop shaping circuit is configured to detect non-repeatable runout disturbances in the position error signal and to responsively adjust at least one parameter of a transfer function of the non-repeatable runout compensator.

22. The apparatus of claim 21 wherein the real-time adaptive loop shaping circuit includes a band-pass filter to detect non-repeatable runout disturbances in the position error signal.

23. The apparatus of claim 17 wherein the vibration damping circuit includes a rotational vibration compensator to cancel rotational vibration disturbances, and wherein the real-time adaptive loop shaping circuit is configured to detect rotational vibration disturbances in the position error signal and to responsively adjust at least one parameter of a transfer function of the rotational vibration compensator.

24. The apparatus of claim 23 wherein the real-time adaptive loop shaping circuit includes a low-pass filter to detect rotational vibration disturbances in the position error signal.

25. The apparatus of claim 17 wherein the vibration damping circuit includes a plurality of disturbance adjustment compensators to cancel vibration disturbances at different frequency ranges, and wherein the real-time adaptive loop shaping circuit is configured to detect vibration disturbances at the different frequency ranges in the position error signal and to responsively adjust at least one parameter of a transfer function of at least one of the plurality of disturbance compensators.

26. The apparatus of claim 17 wherein the real-time adaptive loop shaping circuit includes a learning component that adjusts a speed of adaptation of the servo loop.

* * * * *